United States Patent Office 3,158,534
Patented Nov. 24, 1964

3,158,534
SYNERGISTIC FUNGICIDAL COMPOSITIONS
Paul-Ernst Frohberger, Burscheid, Bezirk Dusseldorf, and Ewald Urbschat, Cologne-Mulheim, Germany, assignors to Farbenfabriken Bayer Aktiengesellschaft, Leverkusen, Germany, a corporation of Germany
No Drawing. Filed Oct. 24, 1961, Ser. No. 147,179
Claims priority, application Germany Oct. 28, 1960
8 Claims. (Cl. 167—22)

The present invention relates to and has as its object the control of fungus plant diseases by means of agents for the dressing of seed and/or soil treatment, consisting of or containing combinations of DAS, QOBH and derivatives of DAS with pentachloronitrobenzene (PCNB) or tetramethylthiuram disulfide (TMTD).

The following compounds, described above as DAS, QOBH, and derivatives of DAS, are known to have excellent activity against fungus plant disease in the form of the free acids or their metallic salts:

(I) 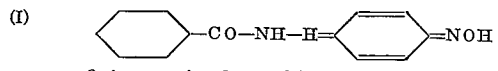

Quinone-oxime-benzoyl-hydrazone (=QOBH)

(II) 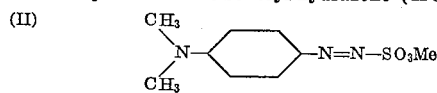

p-Dimethylamino-phenyl-diazo-sulfonic acid (=DAS)

The following active compounds are described above as derivatives of DAS and will be so described below:

(III) 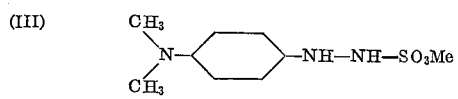

p-Dimethylamino-phenyl-hydrazine-sulfonate (IV) 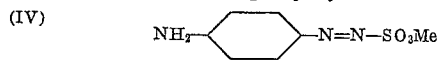

p-Amino-benzene-azo-sulfonate (V) 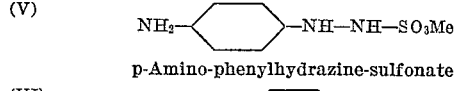

p-Amino-phenylhydrazine-sulfonate (VI) 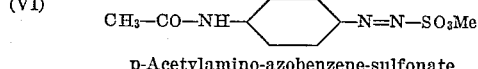

p-Acetylamino-azobenzene-sulfonate (Me=hydrogen or salt forming radical)

These compounds are particularly suitable for application as seed dressings or as agents for soil treatment against seedling and root diseases caused by soil fungi. In some cases, they exhibit a degree of activity which cannot be attained with any other known similar preparation at the same rate of application of the active agent. This high activity potential is particularly manifest towards Phycomcetes of the species *pythium, aphanomyces,* and *phytophthora*. However, if the seedling or root diseases are caused, for example, by the fungus species Rhizoctonia or Fusarium, or if seedborne fungi such as Rhoma or Botrytis, contribute to a large extent to their origin, the effect of the specified preparations is unsatisfactory.

Since in many cases, it cannot be foreseen which of the disease-causing fungi will cause infection in the various cultivated plants on different soils under a variety of weather conditions, preparations such as those specified above which exhibit high efficiency towards a few species of fungi only must be regarded as unreliable.

In accordance with this invention it has now been found that this unreliability is largely eliminated when the specified compounds are applied in combination with, e.g. pentachloronitrobenzene (PCNB) or tetramethylthiuram disulfide (TMTD). The spectrum of activity of the mixed compositions is considerably widened compared with that of the individual components. The weak activity of the preparations I to VI against Rhizoctonia is, in particular, compensated for by the addition of PCNB, whilst the activity against Phycomycetes lacking in PCNB is incorporated into the mixture by one of the preparations specified under I to VI. Pythium and Rhizoctonia are regarded as those species of fungi which cause the greatest economic damage and which mainly require control.

TMTD has a relatively wide spectrum of activity, but is not satisfactory in respect of Phycomycetes activity. The combination with one of the preparations specified under I to VI produces an agent which, in addition to an extensive activity, exhibits a distinct peak efficiency against Phycomycetes.

These combinations can chiefly be considered for soil treatment, but may also be applied as seed dressings.

An optimum activity is attained with the combined preparations when one of the preparations specified under I to VI and PCNB or TMTD are contained in the rate of 1:100 to 2:1. These mixed preparations can of course also contain inert materials, dressing agents and other plant protecting agents such as, e.g., fungicides, insecticides, nematicides or agents for the improvement of soil structure and fertilisers, in addition to the specified agents. They may be formulated in the form of compositions to be scattered, dusted, or sprayed, and may constitute granulates, powders, pastes, suspensions, emulsions and genuine solutions.

The following example is given for the purpose of illustrating the invention.

EXAMPLE

Greenhouse growth tests at temperatures of about 20° C.
Seed: Peas.
Soil: Fruhstorf Standard Soil, sterilised—
  (a) Non-inoculated
  (b) Inoculated with *Pythium ultimum*
  (c) Inoculated with *Rhizoctonia solani*
  (d) Inoculated with *Phythium ultimum* and *Rhizoctonia solani*

Application of the Preparations as Soil Treatment Agents

| No. | Preparation | Concn. of agent in soil, as p.p.m. | Number of healthy plants, out of 100 peas, 3 weeks after sowing | | | |
|---|---|---|---|---|---|---|
| | | | a | b | c | d |
| 1 | Untreated | | 92 | 0 | 2 | 0 |
| 2 | II | 25 | 93 | 89 | 3 | 7 |
| 3 | PCNB | 100 | 87 | 0 | 85 | 0 |
| 4 | TMTD | 100 | 91 | 35 | 67 | 32 |
| 5 | II+PCNB | 20+80 | 93 | 91 | 84 | 86 |
| 6 | II+TMTD | 20+80 | 94 | 92 | 69 | 64 |
| 7 | IV | 50 | 89 | 82 | 4 | 5 |
| 8 | IV+PCNB | 33+67 | 91 | 83 | 79 | 86 |
| 9 | IV+TMTD | 33+67 | 92 | 87 | 65 | 66 |
| 10 | V | 50 | 90 | 89 | 0 | 2 |
| 11 | V+PCNB | 33+67 | 90 | 85 | 78 | 83 |
| 12 | V+TMTD | 33+67 | 92 | 91 | 63 | 65 |

We claim:

1. A fungicidal composition containing as principal active ingredient an effective amount of a mixture consisting of
  (A) p-dimethylaminophenyl-diazo-sulfonic acid, and
  (B) a component selected from the group consisting of pentachloronitrobenzene and tetramethylthiuram disulfide;
the ratio of (A) to (B) being about 20:80 parts by weight.

2. A fungicidal composition containing as principal active ingredient an effective amount of a mixture consisting of
(A) a component selected from the group consisting of p-amino-benzene-azo-sulfonate and p-amino-phenyl hydrazine-sulfonate and
(B) a component selected from the group consisting of pentachloronitrobenzene and tetramethylthiuram disulfide;

the ratio of (A) to (B) being about 33:67 parts by weight.

3. A fungicidal composition containing as active ingredient an effective amount of a mixture of p-dimethyl-amino-phenyl-diazo-sulfonic acid and pentachloronitrobenzene; employed in the ratio of about 20:80 parts by weight.

4. A fungicidal composition containing as active ingredient an effective amount of a mixture of p-dimethyl-amino-phenyl-diazo-sulfonic acid and tetramethylthiuram disulfide; employed in the ratio of about 20:80 parts by weight.

5. A fungicidal composition containing as active ingredient an effective amount of a mixture of p-amino-benzene-azo-sulfonate and pentachloronitrobenzene employed in a ratio of about 33:67 parts by weight.

6. A fungicidal composition containing as active ingredient an effective amount of a mixture of p-amino-phenylhydrazine-sulfonate and pentachloronitrobenzene, at a ratio of about 33:67 parts by weight.

7. A fungicidal composition containing as active ingredient an effective amount of a mixture of p-amino-benzene-azo-sulfonate and tetramethylthiuram disulfide employed in a ratio of about 33:67 parts by weight.

8. A fungicidal composition containing as active ingredient an effective amount of a mixture of p-amino-phenyl-hydrazine-sulfonate and tetramethylthiuram disulfide employed in a ratio of about 33:67 parts by weight.

References Cited in the file of this patent

Hanna: Handbook of Agricultural Chemicals, 2nd ed. (1958), pages 187, 193, 199.